(12) United States Patent
Jha et al.

(10) Patent No.: US 12,091,190 B2
(45) Date of Patent: Sep. 17, 2024

(54) AIRCRAFT PASSENGER SERVICE UNIT

(71) Applicant: Goodrich Lighting Systems Gmbh & Co. KG, Lippstadt (DE)

(72) Inventors: Anil Kumar Jha, Lippstadt (DE); Jens Leuschner, Möhnesee (DE); Carsten Pawliczek, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 189 days.

(21) Appl. No.: 17/703,062

(22) Filed: Mar. 24, 2022

(65) Prior Publication Data
US 2022/0306316 A1 Sep. 29, 2022

(30) Foreign Application Priority Data
Mar. 25, 2021 (EP) .................................... 21164890

(51) Int. Cl.
*B64D 45/00* (2006.01)
*A62B 7/14* (2006.01)
*B64D 11/06* (2006.01)

(52) U.S. Cl.
CPC ............... *B64D 45/00* (2013.01); *A62B 7/14* (2013.01); *B64D 11/06* (2013.01)

(58) Field of Classification Search
CPC ............ B64D 45/00; B64D 11/06; A62B 7/14
See application file for complete search history.

(56) References Cited

U.S. PATENT DOCUMENTS 6,298,311 B1 * 10/2001 Griffin .............. B60R 21/01534
702/159
7,253,744 B2 8/2007 Colacecchi
8,930,088 B2 1/2015 Bauer et al.
(Continued)

FOREIGN PATENT DOCUMENTS

EP 3299293 A1 3/2018
GB 2496452 * 11/2011 ............... B60N 2/90
JP 2020138643 * 2/2019

OTHER PUBLICATIONS

Extended European Search Report for International Application No. 21164890.2 dated Aug. 30, 2021, 5 pages.

*Primary Examiner* — Hongmin Fan
(74) *Attorney, Agent, or Firm* — CANTOR COLBURN LLP (57) ABSTRACT

An aircraft passenger service unit includes infrared sensor configured for detecting infrared radiation and for providing a corresponding sensor output, and a controller, which is configured for receiving and evaluating the sensor output provided by the infrared sensor. The infrared sensor is an infrared sensor array configured for detecting infrared radiation emitted within a plurality of spatial sectors covering a detection area below the aircraft passenger service unit; and the infrared sensor array is configured for detecting the infrared radiation individually for each spatial sector and for providing individual sensor signals for the plurality of spatial sectors. The infrared sensor array is configured such that each passenger seat arranged within the detection area is covered by at least two of the plurality of spatial sectors, respectively; and the controller is configured for determining a passenger seating position within a passenger seat from the individual sensor signals.

14 Claims, 7 Drawing Sheets

(56) References Cited

U.S. PATENT DOCUMENTS

| | | | |
|---|---|---|---|
| 9,302,781 B2 | 4/2016 | Jouper et al. | |
| 10,144,512 B2 | 12/2018 | Gagnon et al. | |
| 10,479,524 B2 | 11/2019 | Pozzi et al. | |
| 10,752,130 B2 | 8/2020 | Schevardo et al. | |
| 2009/0108649 A1* | 4/2009 | Kneller | B64D 11/00 |
| | | | 244/129.1 |
| 2012/0292986 A1 | 11/2012 | Riedel et al. | |
| 2014/0233959 A1 | 8/2014 | Ibrahim et al. | |
| 2015/0239573 A1* | 8/2015 | Jouper | B64D 11/0015 |
| | | | 701/3 |
| 2017/0073073 A1* | 3/2017 | Gagnon | B60Q 3/82 |
| 2017/0113801 A1* | 4/2017 | Brunaux | B64D 11/0015 |

\* cited by examiner

AIRCRAFT PASSENGER SERVICE UNIT

CROSS-REFERENCE TO RELATED APPLICATIONS

This application claims priority to European Patent Application No. 21164890.2 filed Mar. 25, 2021, the entire contents of which is incorporated herein by reference.

TECHNICAL FIELD

The present invention is in the field of aircraft passenger service units for being installed above passengers seats within the passenger cabin of an aircraft.

BACKGROUND

In commercial aircraft, the presence of passengers needs to be checked before take-off, in order to ensure that the correct number of passengers have boarded the aircraft. Further, the seating positions of the passengers need to be checked before take-off and landing, in order to ensure that all passengers are seated in the correct seating position, in particular in a position in which the backrests of all passenger seats are oriented upright and every table is folded into its stored position. For performing these tasks, members of the cabin crew need to walk through the aircraft, in order to manually count and check all passengers.

It would be beneficial to provide a device and a method which assist the members of the cabin crew in performing these tasks and which help to reduce the risk of errors in counting and checking the passengers.

SUMMARY

Exemplary embodiments of the invention include an aircraft passenger service unit for being installed in an overhead position in an aircraft passenger cabin. The aircraft passenger service unit comprises an infrared sensor, which is configured for detecting infrared radiation and for providing a corresponding sensor output. The aircraft passenger service unit further comprises a controller, which is configured for receiving and evaluating the sensor output provided by the infrared sensor. The infrared sensor is an infrared sensor array configured for detecting infrared radiation emitted within a plurality of spatial sectors covering a detection area below the aircraft passenger service unit. The infrared sensor array is configured for detecting the infrared radiation individually for each spatial sector and for providing individual sensor signals for the plurality of spatial sectors. The infrared sensor array is further configured such that each passenger seat arranged within the detection area is covered by at least two of the plurality of spatial sectors, respectively. The controller is configured for determining a passenger seating position within a passenger seat from the individual sensor signals.

Exemplary embodiments of the invention include also an aircraft, such as an airplane or a helicopter, comprising a passenger cabin and at least one aircraft passenger service unit according to an exemplary embodiment of the invention.

Exemplary embodiments of the invention further include a method of determining a passenger seating position within a passenger seat in an aircraft passenger cabin, wherein the method includes individually sensing infrared radiation emitted within a plurality of spatial sectors covering a detection area below the aircraft passenger service unit, wherein each passenger seat arranged within the detection area is covered by at least two of the plurality of spatial sectors; providing individual sensor signals for the plurality of spatial sectors; and determining the passenger seating position by evaluating the individual sensor signals.

An aircraft passenger service unit and a method according to exemplary embodiments of the invention allow for automatically determining whether a passenger seat in an aircraft is occupied or not. An aircraft passenger service unit and a method according to exemplary embodiments of the invention further allow for automatically determining the seating position of passengers sitting in passenger seats within an aircraft cabin. Exemplary embodiments of the invention in particular allow for determining whether the backrest of a passenger seat is in its upright position or not. As a result, exemplary embodiments of the invention support the members of the cabin crew in preparing the aircraft for take-off and landing. Further, by automatically counting the passengers present within the passenger cabin and automatically checking the seating positions of the passengers, the risk of human error is reduced. In consequence, the safety of the aircraft is enhanced.

As exemplary embodiments of the invention are based on the detection of infrared radiation emitted by the passengers and no pictures of the passengers are taken using visible light, the privacy of the passengers may be maintained. Exemplary embodiments of the invention may work passively, without emitting any electromagnetic waves into the passenger cabin.

Aircraft passenger service units generally combine many functions in a single device, such as emergency oxygen supply to passengers in the event of a drop in cabin pressure, seat lighting through the built-in reading lights, supplying fresh air to the passengers via gaspers, and the no-smoking and fasten seat belt signs as a communication path from the aircraft crew to the passengers. Due to its location above the passenger seats, an aircraft passenger service unit is in the ideal position for interacting with the passengers.

By integrating an infrared sensor array into a passenger service unit, as proposed by the present application, no additional space is needed for installing the infrared sensor array in the passenger cabin, and the costs for installing the additional sensor may be kept low.

The infrared sensor array is configured such that each passenger seat, arranged within the detection area, is covered by at least two of the plurality of spatial sectors. It is possible that each passenger seat is covered by a line arrangement of spatial sectors or by a two-dimensional array of spatial sectors. The line arrangement associated with a particular passenger seat may extend along the longitudinal direction of the aircraft. In a line arrangement associated with a particular passenger seat, the passenger seat may be covered by 3 or more spatial sectors, in particular by between 3 and 20 spatial sectors, more in particular by between 5 and 10 spatial sectors. In a two-dimensional array associated with a particular passenger seat, the passenger seat may be covered by 2 or more spatial sectors, in particular by between 2 and 30 spatial sectors, further in particular by between 2 and 10 spatial sectors, further in particular by between 3 and 5 spatial sectors, in the transverse direction of the aircraft and by 4 or more spatial sectors, in particular by between 4 and 100 spatial sectors, further in particular by between 4 and 20 spatial sectors, further in particular by between 5 and 10 spatial sectors in the longitudinal directions of the aircraft.

In an embodiment, the controller is configured for generating a thermal image, also referred to as heat map, of the detection area from the individual sensor signals received from the infrared sensor array. The presence of passengers in the detection area and the seating positions of theses passengers may then be determined by analyzing said thermal image. Generating and analyzing a thermal image provides an efficient and reliable way of determining the presence and the seating positions of passengers from the sensor output provided by the infrared sensor array.

In an embodiment, the controller is configured for identifying at least one passenger body part, in particular a passenger head or passenger legs, from the individual sensor signals. The controller may in particular be configured for identifying at least one passenger body part within the thermal image generated from the sensor output. Identifying at least one passenger body part, in particular a passenger head or passenger legs, may allow for reliably determining the seating position of the passenger. Determining the position of the passenger head in particular may allow for determining the position of a backrest of the passenger seat as well. Determining the position of the passenger legs may allow for determining whether a table is arranged in its stored position or in a basically horizontal position, in which it covers the passenger legs.

In an embodiment, the aircraft passenger service unit comprises at least one reading light, and the controller is configured for controlling a light intensity distribution, which is emitted by the at least one reading light, based on the individual sensor signals, in particular based on the passenger seating position determined by the controller. Such a configuration allows for enhancing the comfort of the passenger by adjusting the light intensity distribution emitted by the passenger's personal reading light to the passenger's current seating position.

Such a configuration may further allow for automatically adjusting the light intensity distribution emitted by all reading lights installed within the passenger cabin when the seat configuration/seat layout of the cabin is modified. As a result, the seat configuration/seat layout within the passenger cabin may be modified without the need for manually adjusting the light intensity distribution emitted by the reading lights to the new seat configuration.

In an embodiment, the aircraft passenger service unit comprises at least one gasper, and the controller is configured for controlling a distribution of air, which is output by the at least one gasper, based on the individual sensor signals, in particular based on the passenger seating position determined by the controller. Such a configuration allows for enhancing the comfort of the passenger by adjusting the air output, emitted by a passenger's personal gasper, to the passenger's current seating position. It may further allow for automatically adjusting the air output by all gaspers within the passenger cabin to a modified seat configuration/seat layout. In consequence, the seat configuration within the passenger cabin may be modified without the need for manually adjusting all gaspers to the new seat configuration.

In an embodiment, the controller is configured for selectively operating in one of a learning mode and an evaluation mode. In such a configuration, operating in the learning mode includes generating at least one individual passenger heat signature from the individual sensor signals received from the infrared array sensor, and operating the controller in the evaluation mode includes determining the current passenger seating position by comparing a currently received sensor output with the at least one individual passenger heat signature. Generating an individual passenger heat signature and using said individual passenger heat signature for determining the current passenger seating position enhances the reliability of the result of said determination.

In a further embodiment, individual passenger heat signatures may be used for identifying individual passengers. This may be used for controlling devices within the passenger cabin, such as reading lights and/or gaspers, according to the identified passengers' personal preferences. As a result, the comfort of the passengers may be enhanced. Also, instances of passengers switching seats may be automatically detected.

In an embodiment, the controller is configured for determining, based on the individual sensor signals, whether a passenger seat is occupied or not. The controller may in particular be configured for reporting an occupancy status of the passenger seat to a seat occupancy monitoring device. The seat occupancy monitoring device may be configured for counting the number of occupied passenger seats and/or for visually displaying the occupancy status of the passenger seats on a display. This may assist the cabin crew in checking the correct occupancy of the passenger cabin. Additionally or alternatively, the occupancy status of the passenger seats may be indicated at the passenger service unit, e.g. by lights which are activated/deactivated or which change color as a function of the determined occupancy status.

In an embodiment, the controller is configured for deactivating an emergency oxygen supply, which is assigned to a passenger seat, when the passenger seat to which the emergency oxygen supply is assigned is not occupied. This may prevent wasting oxygen for an unoccupied passenger seat and may allow for saving said oxygen for the passengers which are present within the passenger cabin.

In an embodiment, the controller is configured for determining a passenger body temperature from the received sensor output and for issuing an alarm signal in case the determined passenger body temperature exceeds a predetermined limit. Such a configuration may allow for automatically detecting sick and potentially infectious passengers within the passenger cabin. As a result, the risk of infecting other passengers during the flight may be reduced by removing passengers with an increased body temperature from the passenger cabin before take-off and/or by isolating passengers with an increased body temperature.

In an embodiment, the controller is configured for determining the position of a backrest of a passenger seat from the individual sensor signals, in particular from the determined passenger seating position. The controller may in particular be configured for determining the position of the backrest of the passenger seat from the determined position of the passenger head.

In an embodiment, the aircraft passenger service unit may be configured for issuing an alarm if it determines that the backrest is not arranged in its upright position. The alarm may include a visual alarm signal and/or an acoustic alarm signal. A visual alarm signal may be displayed at the passenger service unit and/or at the seat occupancy monitoring device. Such a configuration may assist the members of the cabin crew in checking that all backrests are in the required upright position for take-off and landing. As a result, the safety of the passengers within the aircraft may be enhanced and the work of the members of the cabin crew may be made easier.

In an embodiment, the controller is configured for determining the position of a table, installed at a passenger seat, from the output provided by the infrared sensor array. The controller may in particular be configured for determining the position of the table based on the whether it is able to determine the position of the passenger legs, in particular the position of the thighs of the passenger. Usually the thighs of the passenger are covered by the table, when the table is arranged in its basically horizontal position for use, and the thighs are visible to the infrared sensor, when the table is arranged in its upright, stored position. The table may extend from the passenger seat of the passenger in question or may extend from another passenger seat arranged in front of the passenger seat of the passenger in question.

The aircraft passenger service unit further may be configured for issuing an alarm in case the table is not arranged in its stored position. The alarm may include a visual alarm signal and/or an acoustic alarm signal. A visual alarm signal may be displayed at the passenger service unit and/or at the seat occupancy monitoring device. Such a configuration may assist the members of the cabin crew in checking that all backrests are arranged in their respective stored positions for take-off and landing. As a result, the safety of the passengers within the aircraft may be enhanced and the work of the members of the cabin crew may be made easier.

In an embodiment, the aircraft passenger service unit comprises a single infrared sensor, and the detection area of said single infrared sensor extends over all passenger seats arranged below the aircraft passenger service unit, in particular over a row or half a row or a third of a row of passenger seats, depending on the aisle configuration of the aircraft. In such a configuration the costs for manufacturing the aircraft passenger service unit are reduced, as only one infrared sensor needs to be installed at each aircraft passenger service unit.

In another embodiment, the aircraft passenger service unit comprises a plurality of infrared sensors. The aircraft passenger service unit may in particular comprise two or three or four or five infrared sensors.

In an embodiment, the aircraft passenger service unit comprises a plurality of infrared sensors, and the detection area of each of the infrared sensors covers one of the passenger seats, respectively. In such a configuration, the operational reliability is enhanced, as a failure or malfunction of a single infrared sensors affects only one passenger seat.

In another embodiment, the aircraft passenger service unit comprises a plurality of infrared sensors, and each infrared sensor array is associated with a subgroup of the passenger seats arranged below the aircraft passenger service unit, respectively. For example, an aircraft passenger service unit, which is configured to be installed over four passenger seats, may comprise two infrared sensors, wherein the detection area of each of the two infrared sensors covers two of the four passenger seats, respectively. Such a configuration is a compromise between a configuration in which the aircraft passenger service unit comprises only one infrared sensor, and a configuration in which the aircraft passenger service unit comprises a single infrared sensor for each seat.

Depending on the number of passenger seats arranged below the aircraft passenger service unit, the functionalities of the passenger service unit, which have been exemplarily described for a single passenger seat, may be multiplied with the number of passenger seats, so that these functionalities are available for each passenger seat arranged below the aircraft passenger service unit. Depending on the number of passenger seats arranged below the aircraft passenger service unit, the functionalities of the passenger service unit may be duplicated or tripled or quadrupled.

BRIEF DESCRIPTION OF THE DRAWINGS

Further exemplary embodiments of the invention will be described with respect to the accompanying drawings, wherein.

DETAILED DESCRIPTION

Figure 1:
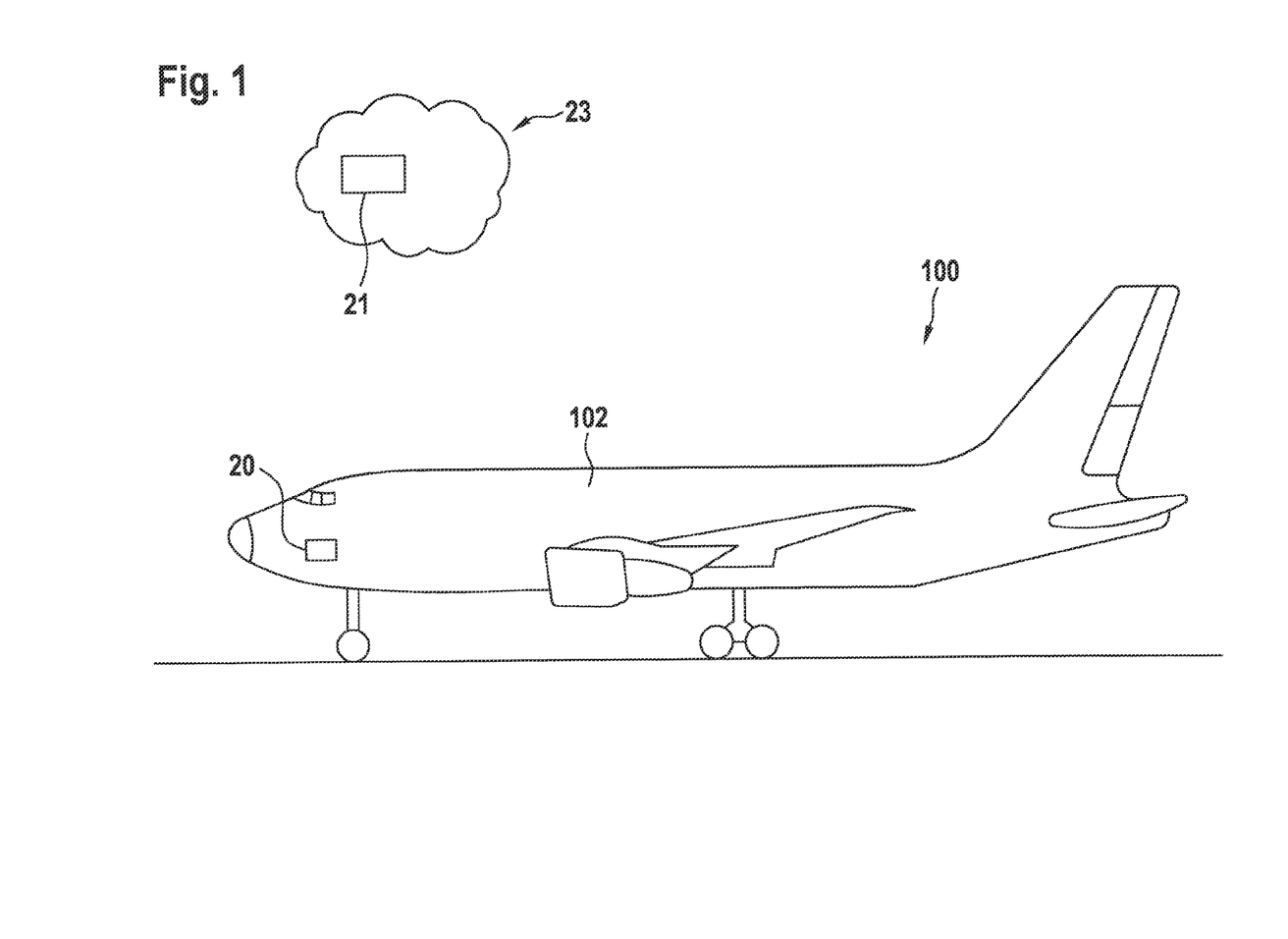
FIG. 1 shows a schematic side view of an aircraft in accordance with an exemplary embodiment of the invention, the aircraft including a passenger cabin.

FIG. 1 shows a schematic side view of an aircraft 100 with a passenger cabin 102. FIG. 1 further shows a storage device 21, which may be part of a virtual cloud system 23.

Figure 2A:
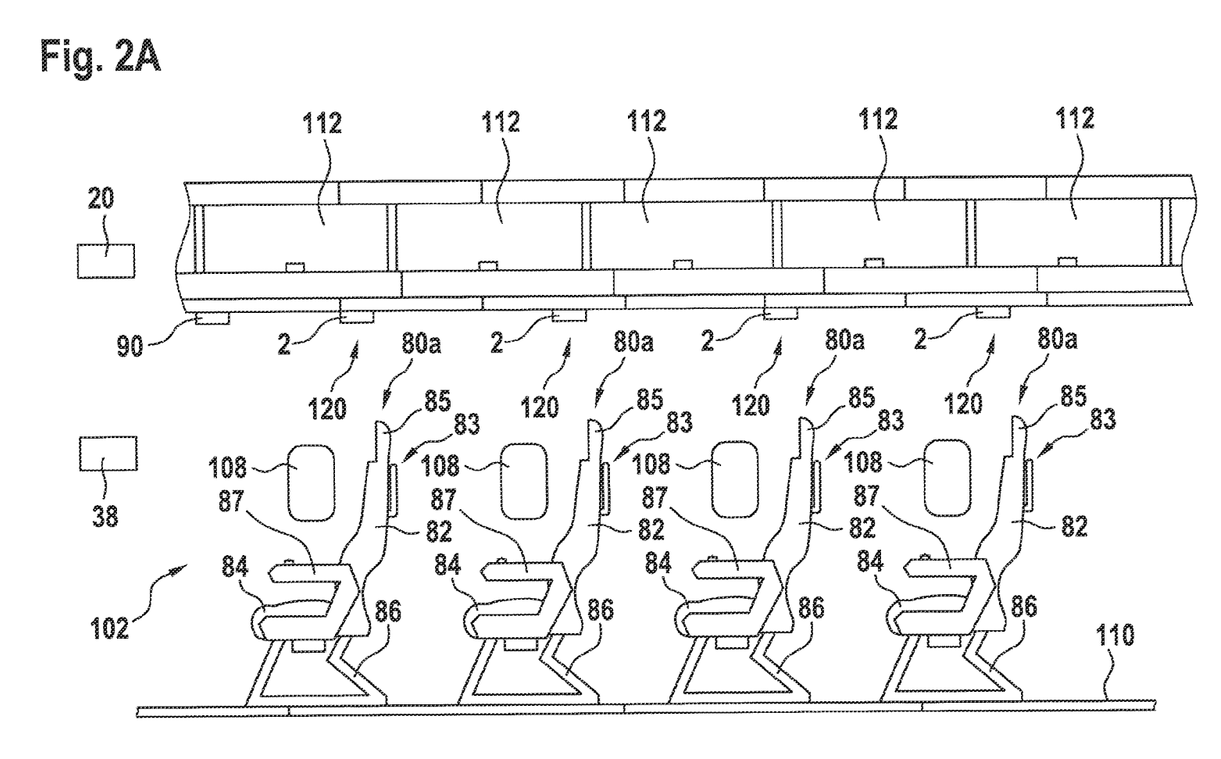
FIG. 2A shows a longitudinal cross-sectional view of a portion of the passenger cabin of the aircraft shown in FIG. 1.
Figure 2B:
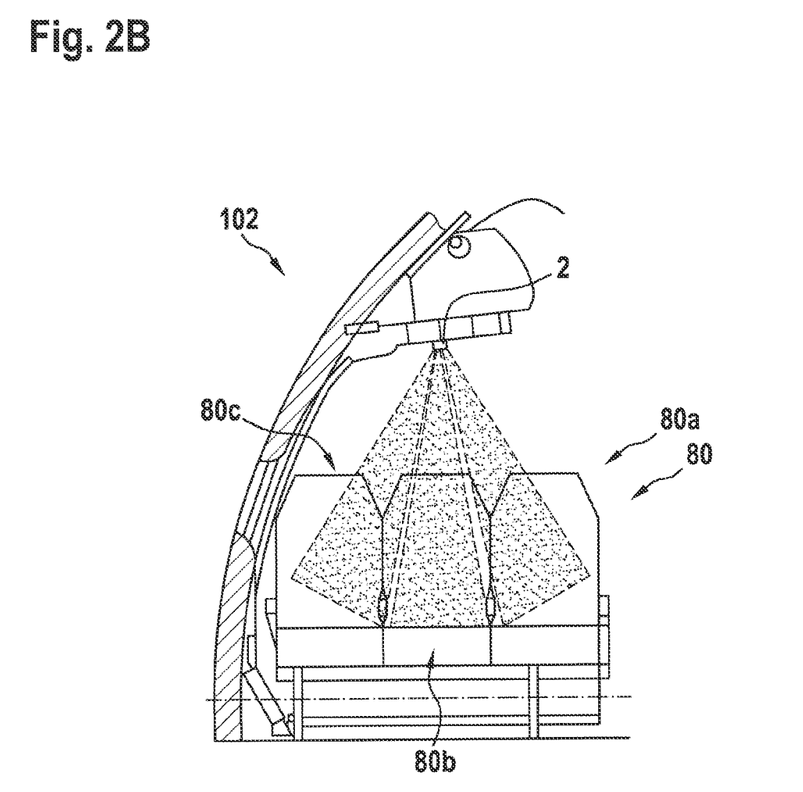
FIG. 2B shows a lateral cross-sectional view of a portion of the passenger cabin of the aircraft shown in FIG. 1.

FIG. 2A shows a longitudinal cross-sectional view of a portion of the passenger cabin 102 of the aircraft 100 shown in FIG. 1. FIG. 2B shows a partial cross-sectional view of the passenger cabin 102 in a plane which is oriented orthogonal to the plane of the longitudinal cross-sectional view depicted in FIG. 2A.

Four seats 80a, also referred to as passenger seats 80a, are shown in FIG. 2A. The passenger seats 80a are mounted to a floor 110 of the passenger cabin 102. Each of the depicted passenger seats 80a belongs to a different seating row 80.

For each of the seating rows 80, a window 108 is provided, which allows the passengers to view the outside of the aircraft 100. Further, a plurality of overhead baggage compartments 112 are shown, which provide storage space for baggage.

Each seating row 80 includes three passenger seats 80a, 80b, 80c arranged next to each other, as shown in FIG. 2B. The second and third passenger seats (middle seat and window seat) 80b, 80c of each seating row 80 are not visible in FIG. 2A, as they are arranged behind and therefore hidden by the depicted first passenger seats (aisle seats) 80a.

Each of the passenger seats 80a has a seat pan 84, a seat base 86, an arm rest 87, and a seat back (backrest) 82, including a head rest 85, and a foldable table 83, mounted to a rear side of the backrest 82. The arm rest 87 may be pivotable around a horizontal axis. The seat base 86 supports the backrest 82 and the seat pan 84.

An aircraft passenger service unit (PSU) 2 is arranged above each of the seat rows 80, respectively.

At least one seat occupancy monitoring device 38, which will be discussed in detail below, may be provided within the passenger cabin 102.

A storage device 20, 21, which also will be discussed later, may be provided inside and/or outside (see FIG. 1) the aircraft 100. The storage device 20, 21 may be part of a virtual cloud system 23.

Figure 3:
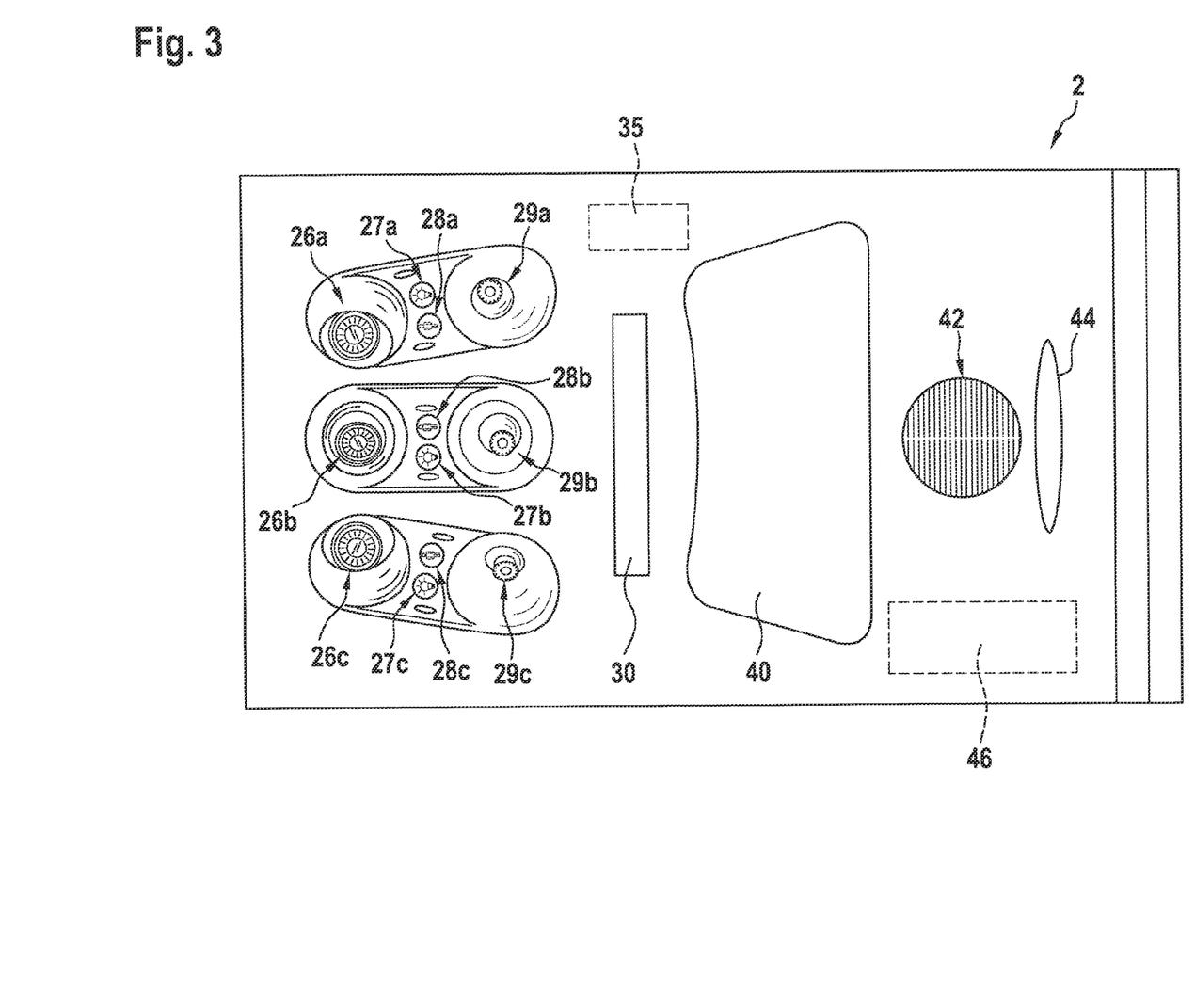
FIG. 3 depicts a schematic view of an overhead passenger service unit.

FIG. 3 depicts a schematic view of an overhead aircraft passenger service unit (PSU) 2, which is arranged above the passengers of a single seating row 80, comprising the passenger seats 80a, 80b, 80c, as it is seen from the side of a passenger sitting on one of the passenger seats 80a, 80b, 80c below the aircraft passenger service unit 2.

On the side shown to the left in FIG. 3, the PSU 2 comprises a row of three adjustable reading lights 26a, 26b, 26c, which are arranged next to each other.

Six electrical switches 27a, 27b, 27c, 28a, 28b, 28c are provided to the right side of the reading lights 26a, 26b, 26c, a pair of two switches 27a, 27b, 27c, 28a, 28b, 28c next to each of the reading lights 26a, 26b, 26c, respectively. One of the switches 27a, 27b, 27c of each pair is configured for switching the adjacent reading light 26a, 26b, 26c, and the second switch 28a, 28b, 28c of each pair is configured for triggering a signal for calling cabin service personnel.

A row of three adjacent gaspers 29a, 29b, 29c, arranged in the lateral direction, is provided next to the switches 27a, 27b, 27c, 28a, 28b, 28c.

Next to the gaspers 29a, 29b, 29c, there is an infrared sensor 30, which is configured for detecting infrared radiation and for providing a corresponding sensor output.

The PSU 2 further comprises a controller 35, which is configured for receiving and evaluating the sensor output provided by the infrared sensor 30. The controller 35 may be arranged inside PSU 2, so that it is not visible from the passenger seats 80a, 80b, 80c during normal operation.

The infrared sensor 30 and the controller 35 are discussed in more detail below with respect to FIGS. 4 to 6.

Next to the infrared sensor 30 is a removable cover 40, which covers a cavity housing at least three oxygen masks (not shown). In the event of pressure loss within the cabin, the removable cover 40 will open, the oxygen masks will drop out of the cavity and each of the passengers, sitting below the aircraft passenger service unit 2, may grasp one of the oxygen masks. The oxygen masks will be supplied with oxygen from an emergency oxygen supply 46, allowing the passengers 90 to continue to breathe normally. The emergency oxygen supply 46, which is also usually not visible from the passenger seats 80a, 80b, 80c during normal operation, may be installed within or separately from the PSU 2.

On the side opposite to the gaspers 29a, 29b, 29c, a grid 42 is formed within the PSU 2. A loudspeaker (not shown), which may be used for delivering acoustic announcements to the passengers, is arranged behind said grid 42.

Next to the grid 42, there is a display panel 44, which may be configured for selectively displaying a plurality of visual signs (not shown), such as "non smoking" or "fasten you seat belt". The display panel 44 may be illuminated from behind, in order to deliver visual information to the passengers sitting below the aircraft passenger service unit 2. The display panel 44 may also be configured for displaying information from the controller 35, in particular information related to the occupancy status of the passenger seats 80a, 80b, 80c and/or related to the seating positions of passengers 90 sitting within the passenger seats 80a, 80b, 80c, as will be described in detail below.

Different embodiments of the PSU 2, which are not explicitly shown in the figures, may be configured to be installed over rows 80 of passenger seats 80a, 80b, 80c comprising more or less than three passenger seats 80a, 80b, 80c. This may in particular include adjusting the number of reading lights 26a, 26b, 26c, electrical switches 27a, 27b, 27c, 28a, 28b, 28c, and gaspers 29a, 29b, 29c to the number of passenger seats 80a, 80b, 80c arranged below the PSU 2.

The exemplary embodiment of the PSU 2 depicted in FIG. 2 comprises a single infrared sensor 30, which is configured for providing a detection area 32 covering three passenger seats 80a, 80b, 80c arranged below the PSU 2.

In alternative embodiments, a separate infrared sensor 30 may be provided for each of the passenger seats 80a, 80b, 80c, respectively. It is also possible that the PSU 2 comprises multiple infrared sensors 30, and that each infrared sensor 30 is associated with a sub-group of the passenger seats 80a, 80b, 80c arranged below the PSU 2. For example, a PSU 2 configured for being installed over a row of four passenger seats may comprise two infrared sensors 30, with each of the two infrared sensors 30 being associated with two of the four passenger seats, respectively.

Figure 4:
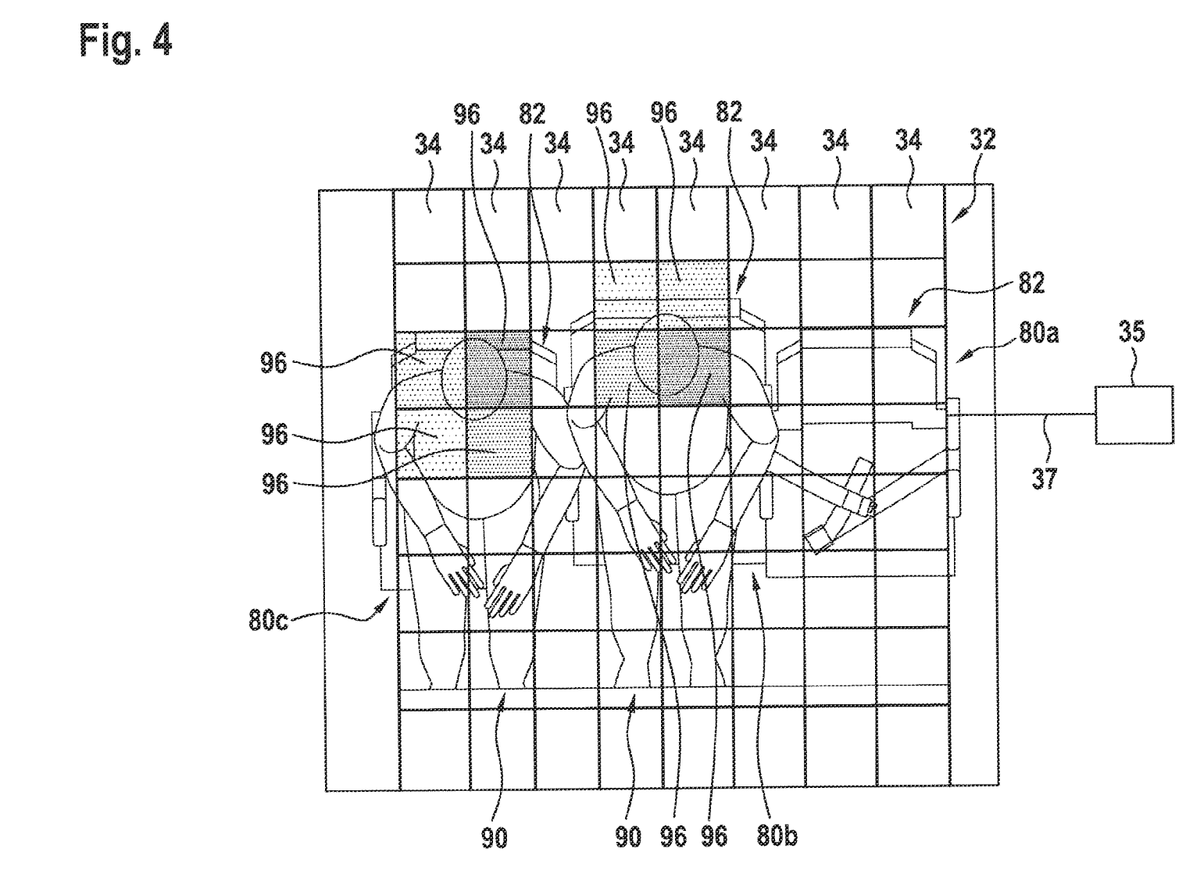
FIG. 4 depicts a schematic view of three passenger seats and two passengers, as seen from the position of the passenger service unit.

FIG. 4 depicts a schematic view of three passenger seats 80a, 80b, 80c and two passengers 90, as seen from the position of the infrared sensor 30 installed within a PSU 2 arranged above the passenger seats 80a, 80b, 80c.

The infrared sensor 30 is an infrared sensor array 30, which is configured for detecting infrared radiation emitted within a plurality of spatial sectors 34. The plurality of spatial sectors 34, in combination, form a detection area 32 below the aircraft passenger service unit 2.

In the embodiment depicted in FIG. 4, the detection area 32 is a rectangular area, in particular a quadratic area, which is covered by a regular grid of 8 times 8 rectangular, in particular square-shaped, spatial sectors 34.

In alternative embodiments, which are not explicitly depicted in the figures, the detection area 32 and the spatial sectors 34 may have alternative shapes. They may in particular have rectangular shapes, which are not square-shaped, or shapes having arcuate, in particular circular or elliptical, contours.

The size and the number of the spatial sectors 34 forming the detection area 32 depicted in FIG. 4 are exemplary. In alternative embodiments, which are not explicitly depicted in the figures, the detection area 32 may comprise more or fewer than 64 spatial sectors 34. Further, the size of the spatial sectors 34 does not need to be constant, as shown in FIG. 4. Instead, the size of the spatial sectors 34 may vary over the detection area 32. The size of the spatial sectors 34, for example, may be smaller in central portions of the detection area 32, in order to provide a high resolution, and the size of the spatial sectors 34 may be larger in peripheral portions of the detection area 32, in order to reduce the costs of the infrared sensor array 30.

The infrared sensor array 30 is configured for detecting the infrared radiation separately for each spatial sector 34 and for providing an individual sensor signal for each of the plurality of spatial sectors 34, respectively.

The infrared sensor array 30 is further configured such that each passenger seat 80a, 80b, 80c, arranged within the detection area 32, is covered by at least two of spatial sectors 34.

As a result, the infrared sensor array 30 allows for detecting details of the distribution of infrared radiation, emitted from each area below the PSU 2 in which a passenger seat 80a, 80b, 80c is arranged. A granular inspection of the detection area 32 may be made possible by the grid of spatial sectors 34.

The infrared sensor array 30 is connected to the controller 35, e.g. by a signal line 37, for supplying the individual sensor signals for the plurality of spatial sectors 34 as sensor output to the controller 35. The controller 35 is configured for receiving the individual sensor signals, provided by the infrared sensor array 30, and for evaluating the combination of said individual sensor signals, in order to determine the presence or absence of passengers 90 on the passenger seats 80a, 80b, 80c and/or to determine the seating positions of passengers 90 ("passenger seating positions") sitting on the passenger seats 80a, 80b, 80c. Evaluating the sensor signals may include employing a software decision matrix/decision tree.

The controller 35 is in particular configured for generating a thermal image 36 of the detection area 32 below the PSU 2 from the received individual sensor signals. An example of such a thermal image 36, also referred to as heat map 36. of a sub-area 33 of the detection area 32, which covers a single passenger seat 80a, is depicted in FIG. 5.

Figure 5:
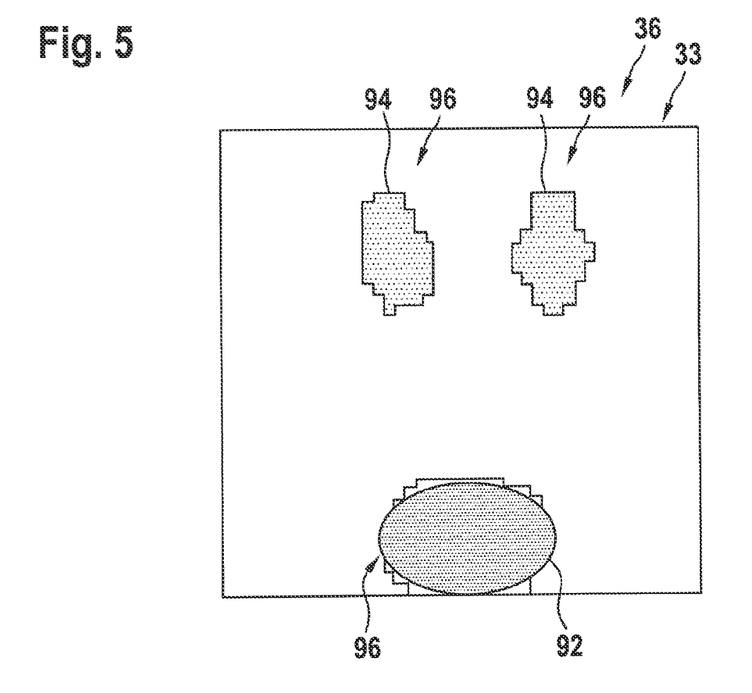
FIG. 5 depicts an example of a thermal image of a single passenger, as seen from the position of the passenger service unit.

FIG. 5 illustrates that body parts 92, 94 of the human body of the passenger 90, in particular the head 92 and the legs 94 of the passenger 90, may be identified in the thermal image 36 as "hot spots" 96, i.e. as areas having a higher temperature and therefore emitting more infrared radiation than the surrounding areas.

The seating position of the passenger 90, sitting within the passenger seat 80a, may by determined from the spatial positions of the body parts 92, 94 of the human body of the passenger 90, which have been identified in the thermal image 36.

As shown in FIG. 4, the positions of the "hot spots" 96 within the thermal image 36, which are generated by the heat emitted from the passenger head 92, change as a function of the seating position of the passenger 90.

The positions of the "hot spots" 96, generated by the passenger head 92, may in particular move backwards towards the rear end of the passenger cabin 102, when the passenger 90 moves the passenger seat 80a, 80b, 80c and/or the backrest 82 of the passenger seat 80a, 80b, 80c backwards.

In consequence, the controller 35 is able to determine the position of every passenger seat 80a, 80b, 80c and/or the position of the backrest 82 of every passenger seat 80a, 80b, 80c from the position of the passenger head 92, which has been determined in the thermal image 36.

This may allow the controller 35 to automatically determine whether the backrest 82 of every passenger seat 80a, 80b, 80c is in its upright position, when required, in particular for take-off and landing. It may further allow the controller 35 to issue an alarm signal and/or an indication at the PSU 2 in case the backrest 82 of the passenger seat 80a, 80b, 80c is not arranged in its upright position when required.

Similarly, the positions of a foldable table 83, mounted to a rear side of a backrest 82 (see FIG. 2A), may be determined and monitored from the thermal image 36. A foldable table 83, which has been moved from its upright, stored position shown in FIG. 2A into a basically horizontal position for use, covers the thighs of the passenger 90. In consequence, the controller 35 will detect the head 92, but not the upper parts (thighs) of the passenger legs 94 within the thermal image 36, when the foldable table 83 has been moved into its basically horizontal position. The controller 35 may be configured for issuing an alarm and/or an indication at the PSU 2 in case the foldable tables 83 is not arranged in its upright position when required.

Unoccupied passenger seats, such as passenger seat 80c in FIG. 4, may be identified by the absence of any "hot spots" within the corresponding thermal image 36.

The controller 35 may be configured for deactivating an emergency oxygen supply 46, assigned to an unoccupied passenger seat, in order to save the available oxygen for the passengers 90 which are present within the passenger cabin 102.

The controller 35 may further be configured for reporting the determined occupancy status of the passenger seats 80a, 80b, 80c to a seat occupancy monitoring device 38 (see FIG. 2A), in order to allow the cabin crew to easily check the occupancy status of the passenger cabin 102 and to compare the detected occupancy status with a boarding list.

The controller 35 may also be configured for controlling light intensity distributions, which are emitted by the reading lights 26a, 26b, 26c, based on the determined passenger seating position(s).

Figure 6:
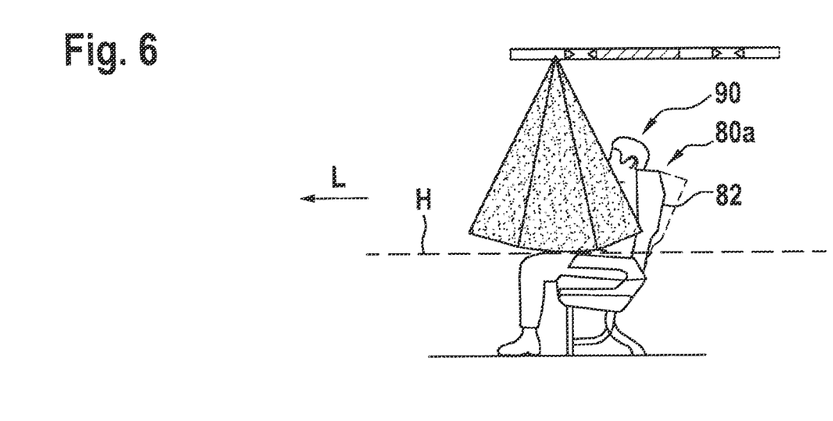
FIG. 6 depicts three different light intensity distributions for a passenger seat.

A schematic side view of a passenger seat 80a, which is occupied by a passenger 90, and three different possible light intensity distributions are schematically shown in the FIG. 6.

Figure 7A:
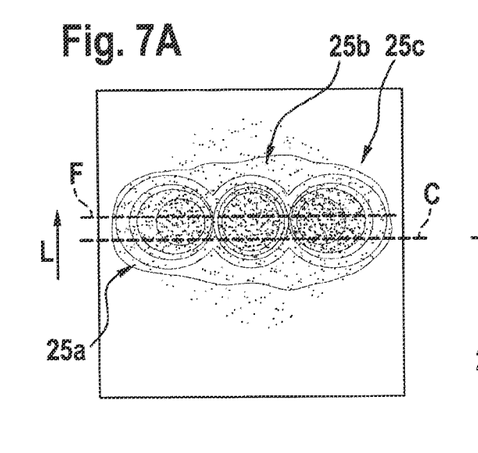
FIGS. 7A to 7C show that the light intensity distributions are centered around a central position C.
Figure 7B:
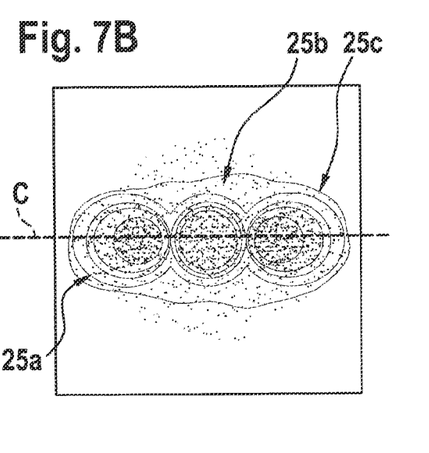
Figure 7C:
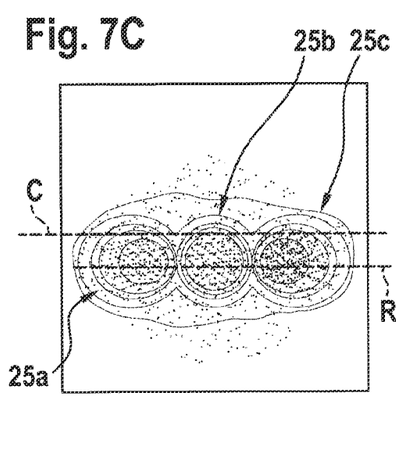

FIGS. 7A to 7C illustrate the light intensity distributions, emitted by the reading lights 26a, 26b, 26c, within a horizontal plane H across the passenger seating space. In each of FIGS. 7A to 7C, the individual light intensity distributions 25a, 25b, 25c of three reading lights 26a, 26b, 26c are recognizable.

The light intensity distributions shown in FIG. 7A correspond to a forward oriented illumination, the light intensity distributions shown in FIG. 7B correspond to a central illumination, and the light intensity distributions shown in FIG. 7C corresponds to a backward oriented illumination.

FIGS. 7A to 7C show that the light intensity distributions are centered around a central position C, when a central seating position has been detected (FIG. 7B), that the light intensity distributions are moved along the longitudinal direction L of the aircraft 100 and are centered around a forward position F, when a forward seating position has been detected and/or when a forward shift of the seating row has taken place during a re-configuration of the aircraft cabin (FIG. 7A), and that the light intensity distributions are moved along the longitudinal direction L of the aircraft 100 and are centered around a rear position R, when a backward seating position has been detected, e.g. when the backrest has been detected to be inclined backwards (FIG. 7C).

Although the light intensity distributions 25a, 25b, 25c are depicted in FIGS. 6, 7A, 7B, and 7C to be adjusted simultaneously for all three reading lights 26a, 26b, 26c of the PSU 2, it is possible that the light intensity distributions 25a, 25b, 25c of the three reading lights 26a, 26b, 26c are adjusted individually for each reading light 26a, 26b, 26c as a function of the determined seating position of the passenger 90 sitting on the corresponding passenger seat 80a, 80b, 80c.

Similarly, the distribution of air output by the gaspers 29a, 29b, 29c may be adjusted based on the determined passenger seating positions as well.

The different passenger seating positions may result from the passengers 90 adjusting their passenger seats 80a, 80b, 80c according to their individual needs. The passengers 90, for example, may individually incline the backrests 82 of the passenger seats 80a, 80b, 80c, as schematically depicted in FIG. 6.

The different seating positions also may result from different installation positions of the passenger seats 80a, 80b, 80c within the passenger cabin 102. A PSU 2 according to an exemplary embodiment of the invention may allow for automatically adjusting the light intensity distributions 25a, 25b, 25c emitted by the reading lights 26a, 26b, 26c and/or automatically adjusting the distribution of air output by the gaspers 29a, 29b, 29c to different seat configurations within the passenger cabin 102, without moving the PSUs 2 to different positions within the passenger cabin 102.

As a result, in an aircraft 100, which is equipped with PSUs 2 according to exemplary embodiments of the invention, the seat configuration within the passenger cabin 102 may be modified easily, without the need for adjusting the positions of the PSUs 2 to the new positions of the passenger seats 80a, 80b, 80c.

In order to detect sick and potentially infectious passengers 90, the controller 35 may further be configured for determining the body temperatures of the passengers 90 ("passenger body temperatures"), sitting below the PSU 2, from the infrared radiation emitted by the passengers 90. The controller 35 may in particular be configured for issuing an alarm if a determined passenger body temperature exceeds a predetermined limit. The controller 35 may also be configured for highlighting the respective passenger seat 80a, 80b, 80c on the seat occupancy monitoring device 38.

For enhancing the quality and reliability of the determination of the passenger's seating position, the controller 35 may be configured for generating and employing an individual heat signature for each passenger 90.

The controller 35 may in particular be configured for operating in a learning mode after a new passenger 90 has taken seat on a passenger seat 80a, 80b, 80c, for example after the boarding of the aircraft 100 has been completed and all passengers 90 have taken their seats.

Operating in the learning mode may in particular include generating at least one individual passenger heat signature from the received individual sensor signals and storing the at least one individual passenger heat signature within the controller 35 and/or within a storage device 20, 21 (see FIGS. 2A and 2B), which is provided separately from the controller 35. The storage device 20, 21 may be provided as an internal storage device 20 within the aircraft 100 (see FIGS. 2B) and/or as an external storage device 21, for example as part of a virtual cloud system 23, outside the aircraft 100, as depicted in FIG. 2A.

After the learning has been completed, the controller 35 may be operated in an evaluation mode, which includes determining the passenger seating position of a passenger 90 by comparing a currently received sensor output with at least one previously generated passenger heat signature.

Generating and using at least one previously generated individual passenger heat signature for determining the current passenger seating position improves the reliability of determining the passenger's current seating position. Individual passenger heat signatures may in particular be used for updating a software decision matrix/decision tree, which is employed for evaluating the sensor signals.

It may further allow for identifying an individual passenger 90 and adjusting the light intensity distributions 25a, 25b, 25c of the adjustable reading lights 26a, 26b, 26c as well as the distribution of air output by the gaspers 29a, 29b, 29c in accordance with the preferences of said passenger 90. A preferred light intensity distribution profile and/or a preferred air output profile, associated with each previously identified passenger 90, may be stored within the controller 35 and/or within the storage device 20, 21. The respective profile(s) may be activated after a passenger 90, who has a stored profile, has been identified.

Using personalized passenger profiles may allow for enhancing the comfort of the passengers 90 by personalizing the light intensity distribution 25-1, 25-2, 25-3 of the adjustable reading lights 26a, 26b, 26c and/or the distribution of air output by the gaspers 29a, 29b, 29c to the respective passenger 90.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft passenger service unit for being installed in an overhead position in an aircraft passenger cabin, the aircraft passenger service unit comprising:
   an infrared sensor, which is configured for detecting infrared radiation and for providing a corresponding sensor output; and
   a controller, which is configured for receiving and evaluating the sensor output provided by the infrared sensor;
   wherein the infrared sensor is an infrared sensor array, comprising a plurality of sensor elements and configured for detecting infrared radiation emitted within a plurality of spatial sectors covering a detection area below the aircraft passenger service unit;
   wherein the infrared sensor array is configured for detecting the infrared radiation individually for each spatial sector and for providing individual sensor signals for the plurality of spatial sectors;
   wherein the infrared sensor array is configured such that each passenger seat arranged within the detection area is covered by at least two of the plurality of spatial sectors, respectively; and
   wherein the controller is configured for determining a passenger seating position within a passenger seat from the individual sensor signals;
   wherein the controller is configured for selectively operating in one of a learning mode and an evaluation mode,
   wherein operating in the learning mode includes generating at least one individual passenger heat signature from the individual sensor signals, and
   wherein operating in the evaluation mode includes determining the passenger seating position by comparing a currently received sensor output with the at least one individual passenger heat signature.

2. The aircraft passenger service unit according to claim 1, wherein the controller is configured for generating a thermal image of the detection area below the aircraft passenger service unit from the individual sensor signals.

3. The aircraft passenger service unit according to claim 1, wherein the controller is configured for identifying a passenger body part, in particular a passenger head or passenger legs, from the individual sensor signals, in particular within the thermal image.

4. The aircraft passenger service unit according to claim 1, further comprising:
   at least one reading light, wherein the controller is configured for controlling a light intensity distribution, emitted by the at least one reading light, based on the individual sensor signals based on the determined passenger seating position.

5. The aircraft passenger service unit according to claim 1, further comprising:
   at least one gasper, wherein the controller is configured for controlling a distribution of air output by the at least one gasper based on the individual sensor signals based on the determined passenger seating position.

6. An aircraft passenger service unit for being installed in an overhead position in an aircraft passenger cabin, the aircraft passenger service unit comprising:
- an infrared sensor, which is configured for detecting infrared radiation and for providing a corresponding sensor output; and
- a controller, which is configured for receiving and evaluating the sensor output provided by the infrared sensor;
- wherein the infrared sensor is an infrared sensor array, comprising a plurality of sensor elements and configured for detecting infrared radiation emitted within a plurality of spatial sectors covering a detection area below the aircraft passenger service unit;
- wherein the infrared sensor array is configured for detecting the infrared radiation individually for each spatial sector and for providing individual sensor signals for the plurality of spatial sectors;
- wherein the infrared sensor array is configured such that each passenger seat arranged within the detection area is covered by at least two of the plurality of spatial sectors, respectively; and
- wherein the controller is configured for determining a passenger seating position within a passenger seat from the individual sensor signals;
- wherein the controller is further configured to:
- determine from the individual sensor signals, whether the passenger seat is occupied or not,
- report an occupancy status of the passenger seat; and
- deactivating an emergency oxygen supply assigned to the passenger seat when not occupied.

7. The aircraft passenger service unit according to claim 1, wherein the controller is further configured for determining a passenger body temperature and for issuing an alarm signal, in case the passenger body temperature exceeds a predetermined limit.

8. The aircraft passenger service unit according to claim 1, wherein the controller is further configured for determining the position of a backrest of the passenger seat from the individual sensor signals the determined passenger seating position, and for issuing an alarm in case the backrest is not arranged in its upright position.

9. The aircraft passenger service unit according to claim 1, comprising a plurality of infrared sensors, in particular two or three or four or five infrared sensors, wherein each of the infrared sensors is assigned to a respective passenger seat.

10. An aircraft comprising:
a passenger cabin; and
at least one aircraft passenger service unit according to claim 1.

11. A method of determining a passenger seating position within a passenger seat in an aircraft passenger cabin, wherein the method includes:
- with an infrared sensor array, comprising a plurality of sensor elements individually sensing infrared radiation emitted within a plurality of spatial sectors covering a detection area below the aircraft passenger service unit, wherein each passenger seat arranged within the detection area is covered by at least two of the plurality of spatial sectors;
- providing individual sensor signals for the plurality of spatial sectors; and
- evaluating the individual sensor signals for determining the passenger seating position;
- wherein the method further includes:
- a learning step, which includes generating at least one individual passenger heat signature from the individual sensor signals; and
- an evaluation step, which includes determining the passenger seating position by comparing a currently received sensor output with the at least one individual passenger heat signature.

12. The method according to claim 11, wherein the method includes generating a thermal image of the detection area from the individual sensor signals and for identifying a passenger body part, in particular a passenger head or passenger legs, within the thermal image.

13. The method according to claim 11, wherein the method further includes at least one of the following:
- controlling a light intensity distribution, emitted by a reading light, based on the individual sensor signals, in particular based on the determined passenger seating position;
- controlling the distribution of air output by a gasper based on the individual sensor signals, in particular based on the determined passenger seating position;
- determining a passenger body temperature from the individual sensor signals and issuing an alarm signal, in case the passenger body temperature exceeds a predetermined limit; or
- determining, from the individual sensor signals, an occupancy status of the passenger seat, wherein the method in particular includes reporting the occupancy status of the passenger seat and/or deactivating an emergency oxygen supply assigned to the passenger seat, if not occupied.

14. An aircraft comprising:
a passenger cabin; and
at least one aircraft passenger service unit according to claim 6.

* * * * *